Feb. 11, 1958     M. BOWEN     2,822,995
ADJUSTABLE WING AIRCRAFT
Filed Jan. 27, 1954     4 Sheets-Sheet 1
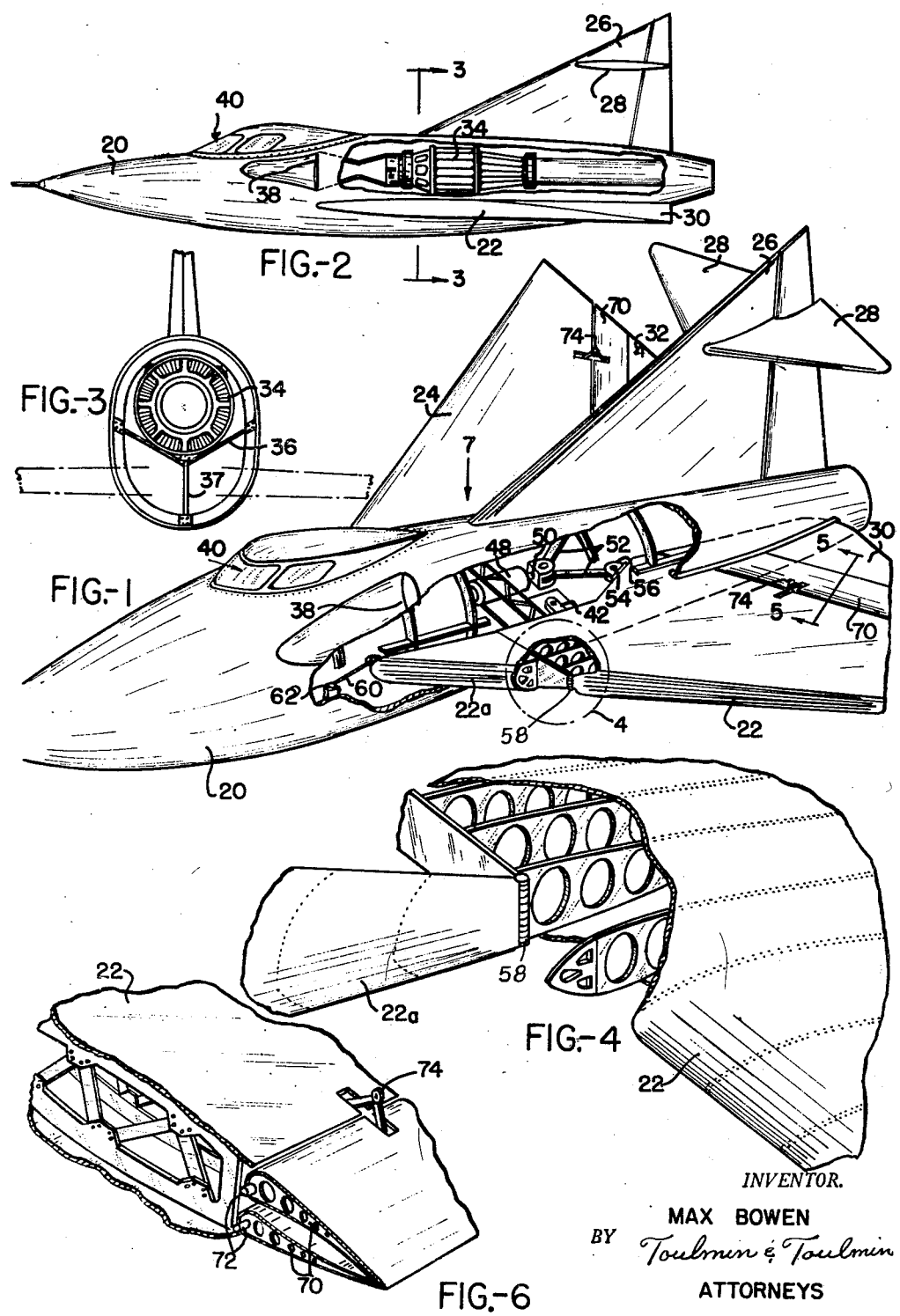
INVENTOR.
MAX BOWEN
BY Toulmin & Toulmin
ATTORNEYS

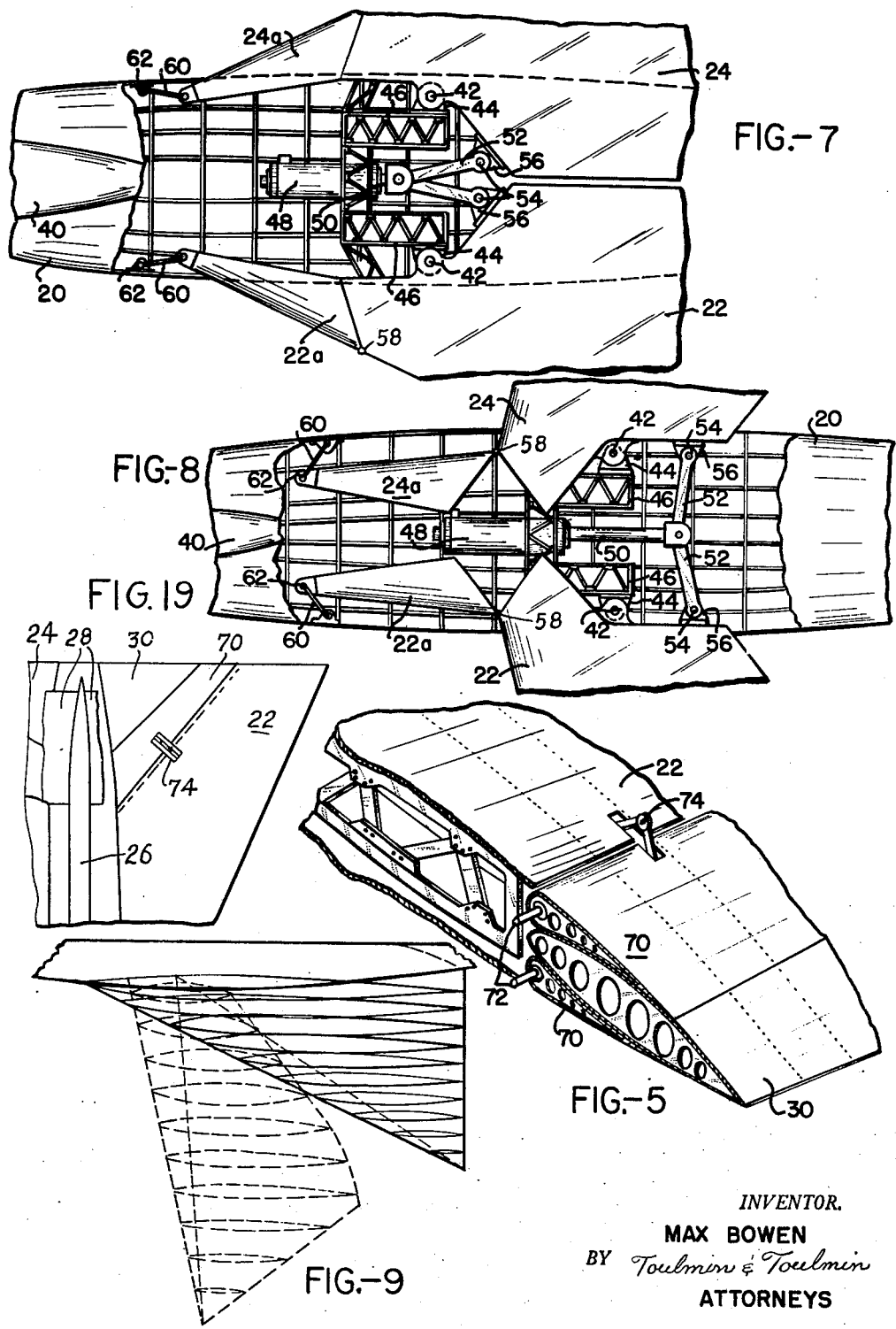

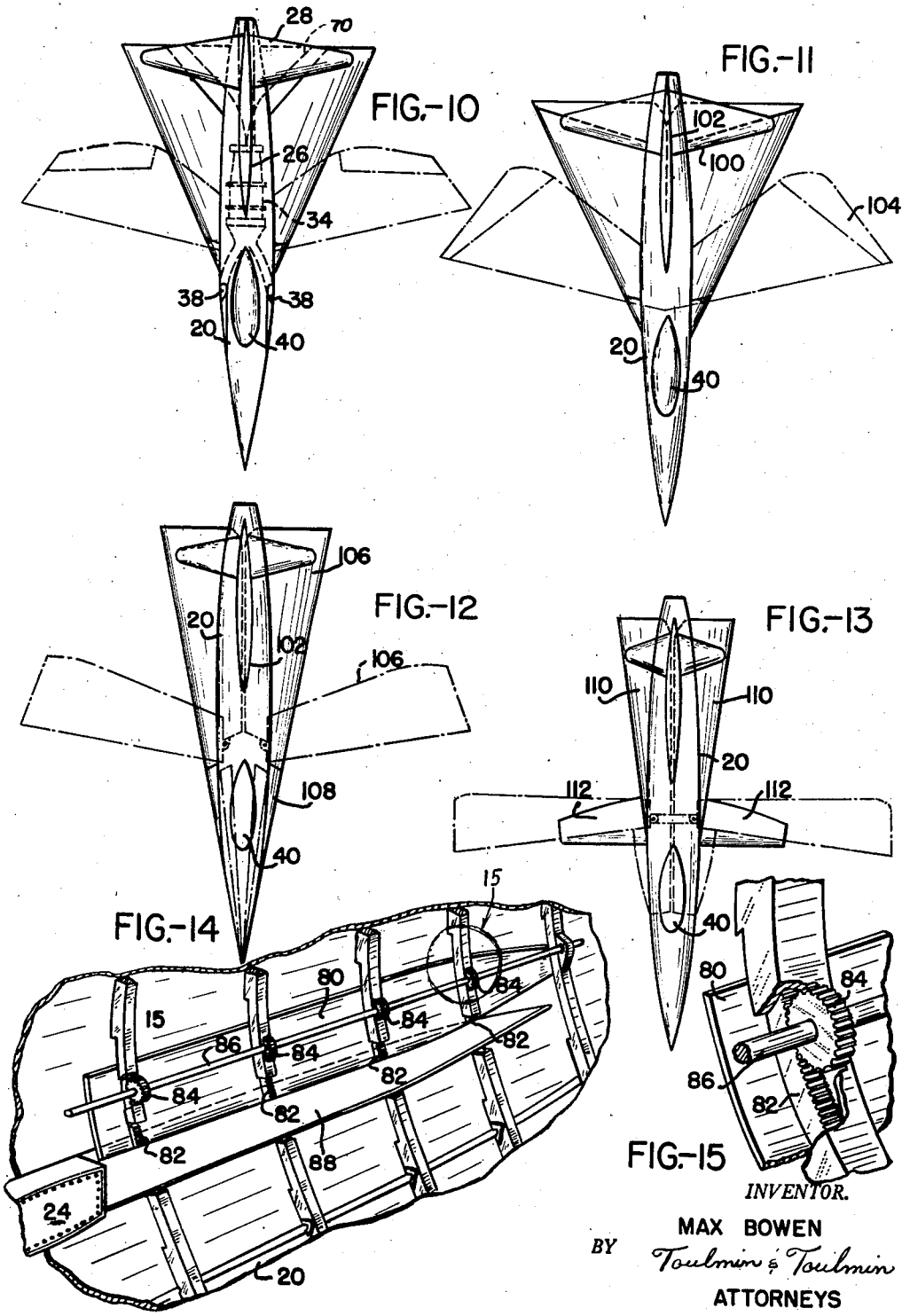

Feb. 11, 1958     M. BOWEN     2,822,995
ADJUSTABLE WING AIRCRAFT
Filed Jan. 27, 1954     4 Sheets-Sheet 4
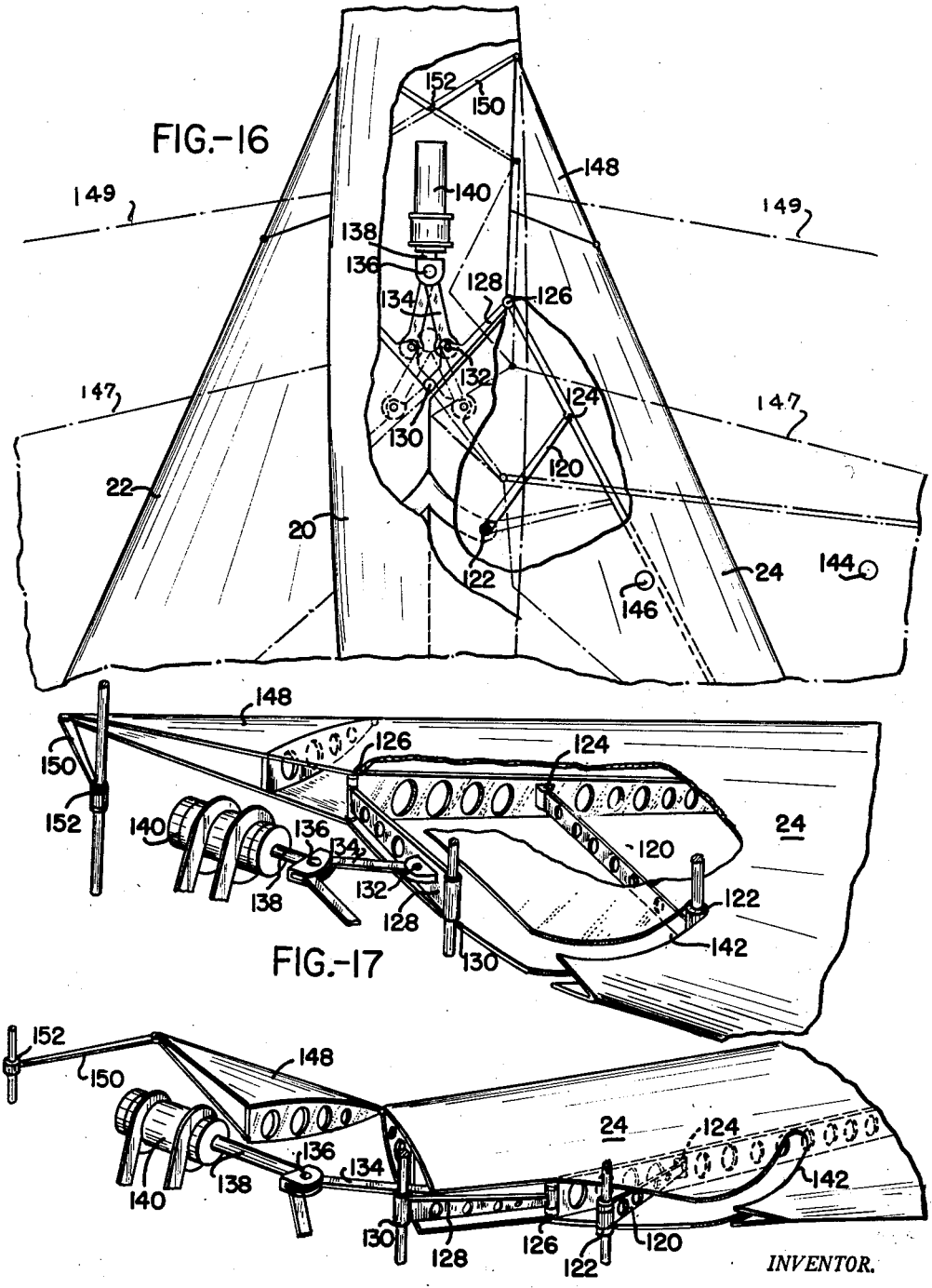
INVENTOR.
MAX BOWEN
BY Toulmin & Toulmin
ATTORNEYS

United States Patent Office 2,822,995
Patented Feb. 11, 1958

2,822,995
ADJUSTABLE WING AIRCRAFT

Max Bowen, Dayton, Ohio

Application January 27, 1954, Serial No. 406,466

6 Claims. (Cl. 244—43)

This invention relates to aircraft, particularly to aircraft such as jet powered aircraft which are capable of flying at extremely high speeds. More particularly still, this invention relates to an aircraft structure characterized by having wings which can be moved between extended and retracted positions.

The general idea of an aircraft with a movable wing is known, but heretofore there have been limitations imposed on the size of the wing and the extent to which it can be moved. For example, wings that are made movable in the fore and aft directions must necessarily be provided by some sort of pivot means to the fuselage at their root ends, and because of this arrangement, when the wings are moved backwardly to a swept-back-position, there is a relative shift between the center of pressure of the wings and the center of gravity of the plane which, if the wings are moved backwardly beyond a predetermined amount, is intolerable. This is particularly true when the wings are moved from a normally lateral position to a sweepback angle greater than the angle of the Mach cone, and which condition must be met for efficient flight at extremely high speeds.

Also, in the conventional aircraft, if the wings are so designed that they will permit extremely high speeds of flight, the landing speed of the craft is unreasonably high due to the restricted area of the wing necessary to meet the condition of high speed flight.

According to the present invention I provide an aircraft structure in which the wings are pivotally carried by the fuselage so that they can be moved from extended positions for take-off and landing, and for low speed flight and to retracted positions, whereby the craft will fly efficiently at the highest attainable speeds and wherein the wings are partially buried in the fuselage in their retracted positions.

The exact nature of this invention will be more clearly understood upon reference to the following specification, wherein:

Figure 1 is a perspective view partly broken away showing an aircraft constructed according to my invention;

Figure 2 is a side elevational view of the aircraft of Figure 1 also partly broken away to show the jet engine power plant therein;

Figure 3 is a transverse sectional view indicated by line 3—3 on Figure 2 showing the manner in which the jet engine power plant is mounted within the fuselage of the craft;

Figure 4 is a fragmentary view showing a hinge connecting two sections of one of the wings and is that portion of the craft within the dot-dash circle marked 4 in Figure 1;

Figure 5 is a perspective sectional view indicated by line 5—5 on Figure 1 showing the manner in which the trailing edge of the wing engages the tail section of the craft when the wing is retracted;

Figure 6 is a view like Figure 5 but shows the appearance of the wing when it is disengaged from the tail section;

Figure 7 is a plan sectional view of the craft of Figure 1 looking down in the direction of the arrow 7 in Figure 1 showing the wings in their fully retracted position and the operating mechanism for moving the wings;

Figure 8 is a view like Figure 7 but showing the wings in their extended position;

Figure 9 is a more or less diagrammatic view showing airfoil sections through the wing in vertical planes parallel to the longitudinal axis of the craft with the wing in both its extended and retracted positions;

Figure 10 is a plan view showing the craft of Figures 1 through 9;

Figure 11 is a plan view like Figure 10 but showing a somewhat modified construction of an aircraft embodying my invention;

Figures 12 and 13 are plan views showing still other modifications of an aircraft embodying my invention;

Figure 14 is a perspective view showing a flap arrangement for closing the slot in the fuselage that is provided for receiving the wing when it is retracted;

Figure 15 is a fragmentary view drawn at somewhat enlarged scale and showing the actuating mechanism of the flap of Figure 14, with the location of the view being indicated by dot-dash circle 15 in Figure 14;

Figure 16 is a fragmentary plan view showing a craft embodying my invention wherein the wings are mounted on floating pivots so that in moving the wings between forward and retracted positions the shift of the center of pressure of the wings is minimized;

Figure 17 is a fragmentary perspective view showing one of the wings of the craft of Figure 16 in retracted position;

Figure 18 is a view like Figure 17 but showing the wing in its extended position; and Figure 19 is a plan view showing the overlapping of the wing and stabilizer of the Figure 1 modification.

Referring to the drawings somewhat more in detail and in particular to Figures 1 through 10, the aircraft shown therein comprises a fuselage 20 having wings 22 and 24, an upstanding tail fin 26 having the laterally extending stabilizer surfaces 28 mounted thereon above the fuselage, and the additional laterally extending stabilizer surfaces 30 and 32 on the fuselage in about the plane of the wings 22 and 24.

The aircraft illustrated, as will be perceived in Figures 2, 3 and 10, is provided with a jet power plant generally designated 34, which is secured within the framework of the fuselage in any suitable and conventional manner, and which may include the bracings 36 shown in Figure 3 that are connected with the longitudinal beam 37. Air inlet means in the form of the side scoops 38 may be provided, and it will be evident that ample space is provided at the forward end of the craft for the operator's compartment at 40.

Referring now to Figures 7 and 8, each of wings 22 and 24 is provided with a pivotal connection 42 within the fuselage adjacent the side thereof. The pivots 42 may comprise vertically extending rods or shafts carried in bracket means 44 that are supported on the framework 46 that is rigidly mounted within the fuselage. Framework 46 is also advantageously utilized for supporting cylinder 48 of a hydraulic motor having a double-acting ram 50 that is connected by the links 52 with the pivot means 54 that are connected by the brackets 56 with the wings 22 and 24 at points spaced from the pivots 42 that connect the wings with the fuselage.

At this point it will be apparent that when the cylinder 48 of the hydraulic motor is supplied with pressure fluid to drive the ram 50 thereof outwardly, the wings 22 and 24 will be swung to their extended positions as indicated in Figure 8. By arranging the hydraulic motor, consisting of cylinder 48 and ram 50, so that the ram either bottoms within the cylinder at the opposite ends of its stroke or so that hydraulic fluid is locked within the cylinder, the wings can be firmly and solidly held in any position of adjustment between their extended and retracted positions. Normally, the wings will occupy either one or the other of their extreme positions, but it is conceivable that it might be desired to operate the aircraft with the wings in an intermediate position.

Inasmuch as the pivot points 42 for the wings must be located rearwardly of the forwardmost portions of the wings in order to minimize the shift in the center of pressure of the wings when they are moved between their extreme positions, the leading edges of the wings at their fuselage ends are provided with the auxiliary portions 22a and 24a pivoted to the fuselage by the links 60 which guide the tips of the auxiliary portions 22a and 24a in arcuate paths about the brackets 62 within the fuselage. Pivot means as at 58 connect auxiliary portions to the wings.

Upon reference to Figures 7 and 8 it will be evident that when the wings are in their retracted positions, as indicated in Figure 7, the auxiliary portions 22a and 24a form continuations of the leading edges of the wings so that the wings will join with the fuselage in an aerodynamically acceptable manner; whereas, when the wings are in their forward position, as in Figure 8, the auxiliary portions 22a and 24a are located inside the fuselage in an ineffective position.

As will be seen in Figures 1 and 10, and indicated in Figure 5, when the wings 22 and 24 are fully retracted they overlap the stabilizer portions 30 and 32. Inasmuch as both the stabilizer portions 30 and 32 and the trailing edges of the wings 22 and 24 must present proper airfoil sections when the wings are in their extended position and also when they are retracted, it is necessary for the trailing edges of the wings or the forward edges of the stabilizer portions to be so arranged that the wings and stabilizers will nest together, thus presenting an acceptable composite airfoil section when the wings are retracted.

According to a preferred manner of accomplishing this, I provide means on the trailing edges of the wings which are illustrated in Figures 1, 5 and 6 so that the wings will embrace the leading edges of the stabilizer portions when the wings are retracted.

As will best be seen in Figures 5 and 6, this means takes the form of a pair of flaps 70 pivoted on the rods 72 to the trailing edges of the wings and having spring means or other actuating devices, as generally represented by the hinged linkage 74, for retaining the flaps 70 in their closed position as in Figure 6 when the wings are in their forward position, while permitting the flaps to be either forced open or to be actuated to open position when the wings move backwardly so that, when the wings are fully retracted, the flaps 70 will embrace the forward edges of the stabilizer portions as is illustrated in Figure 5, thereby forming a composite airfoil section through the wings and stabilizer portions which is aerodynamically acceptable.

The preferred arrangement for actuating the flaps 70 includes mechanism whereby the flaps 70 on each wing can be moved in unison when the wings are in their forward position, whereby the flaps can be employed as ailerons or as landing flaps if so desired.

As will be observed in Figures 1, 7, 8 and 10, the wings of the craft, when they are in their retracted position, are partially buried within the fuselage thus necessitating the provision of slots extending along the sides of the fuselage for receiving the wings. The provision of slots in the fuselage represents no serious problem in connection with the framing of the fuselage, and likewise represents no serious problem when the craft is being flown. However, to provide for better efficiency it is advisable for these slots to be closed. With this in mind I propose the provision of a closure member, such as is illustrated at 80 in Figures 14 and 15, which closure member is slidably mounted within the fuselage and is provided with curved rack elements 82 engaged by pinions 84 mounted on a shaft 86 so that, by rotating shaft 86, closure member 80 can be moved to a position to close the wing slot 88 or can be moved in the opposite direction to open the slot.

I have found that, in arriving at a suitable wing, the best procedure is to design the wing for proper operation when the plane is flying at high speed, that is, when the wing is retracted. Accordingly, the wing is laid out so as to have airfoil sections, as indicated in full lines in Figure 9; this representing a good high speed airfoil. Surprisingly, when this same airfoil was moved to its extended position, as indicated by the dotted outline in Figure 9, and the sections taken thereon as also indicated by the dotted lines in Figure 9, quite satisfactory airfoil sections for low-speed flight are obtained. In particular, the thick airfoil sections near the root, with the resulting high lift coefficients, contributes significantly to the reduction in landing speed of the craft that is obtained when the wing is in its extended position.

The appearance of the craft described above in plan view is illustrated in Figure 10, and it will be noted that the wings, when retracted, form a substantially delta-shape planform while presenting a substantially conventional planform when extended.

In Figure 11 I show a slightly modified arrangement, wherein the horizontal control surface of the tail section at 100 is located on the vertical fin 102, with the tips of the wings also being provided with the control sections 104.

In Figure 12 I show a still further modified form of my invention for an extreme degree of retraction of the wings, wherein each wing 106 comprises, as in the case of the previously described modifications, a forward portion 108 that is disposed within the fuselage when the wings 106 are extended, and which forms a continuation of the leading edges of the wings when the wings are retracted. The portions 108 in Figure 12 extend farther forwardly along the fuselage than the corresponding portions of the modification of Figures 10 and 11, and serve to minimize the rearward shift of the center of pressure of the wings when they are retracted.

In Figure 13 I show an arrangement where each of the principal wings 110 comprises a small auxiliary portion 112 integral therewith and extending therefrom at substantially 90° so that, when wings 110 are extended, the portions 112 thereof are in substantially ineffective position because of being buried in the fuselage as shown in dot-dash outline; whereas, when he wings 110 are retracted as shown in full lines, the auxiliary portions 112 are moved outwardly to a position where they are effective in the airstream thereby providing for lift toward the forward end of the craft to offset the rearward shift of the center of pressure of the retracted wings.

It has been mentioned previously that the retracting of the wings is accompanied by a relative shift between the center of pressure of the wings and the center of gravity of the craft which introduces undesirable conditions.

In the arrangement illustrated in Figures 16 through 18 I have compensated for this by providing a floating pivot for the wings so that when they are retracted the center of pressure undergoes substantially no longitudinal shift from the center of pressure when the wings are extended. This is accomplished, as will be seen in Figures 16 through 18, by providing each wing with an arm 120 pivoted inside the fuselage as at 122 and also pivoted as at 124 to a spar within the wing. The forward end of the said spar is pivoted at 126 to a lever 128 that has its opposite end pivotally supported at 130 within the fuselage and an intermediate point thereof pivoted at 132 to a link 134 that is connected at 136 to ram 138 that is reciprocable within hydraulic cylinder 140.

On account of the location of pivot 122, which comprises a shaft of substantial size arranged vertically within the fuselage and anchored to the frame thereof, the pertaining wing must be provided with an arcuate slot 142 so that when the wing is retracted it will not be halted by the pivot shaft at 122. Figure 17 shows the wing in its retracted position, and Figure 18 shows the wing in its extended position.

It will be evident that the described arrangement locates the pivot point for the wing and controls the movement thereof so that, when the wing is moved from its extended to its retracted position, there is a forward shift of the wing. This forward shift of the wing maintains the center of pressure thereof at substantially the same transverse point along the fuselage of the craft. As will be seen in Figure 16, the center of pressure when the wings are extended is located at 144, and when the wings are retracted the center of pressure is located at 146. Dot-dash lines 147 in Figure 16 show the position of the leading edges of the wings of this modification when extended, while lines 149 show the positions the wings would occupy when extended if provided with the simple pivot means of the previously described modification.

The described movement of the wing in Figures 16, 17 and 18 also requires that the auxiliary portions 148, at the root of the leading edges thereof, be provided with relatively elongated pivot links 150 which may be pivoted at 152 inside the fuselage so that the said portions 148 will take the proper movement so as to lie within the fuselage when the wings are extended and to form the leading edge at the root of the wings when the wings are retracted.

In the foregoing detailed description of my invention it will be appreciated that I have provided an aircraft which it is possible to fly at any given speed, with a wing that will operate in sub-sonic airflow because the sweep-back angle of the wing is greater than the angle of the Mach cone. As higher and higher speeds are attained the leading edges of the wings would require a greater sweep-back to meet this condition, and my design is such that the wings can be swept back to permit the attainment of even the highest speeds. With extreme sweep-back angles, as in Figure 12, the auxiliary portions 103 may extend almost to the nose of the craft to provide for a proper distribution of the wing area.

The design of an aircraft, according to my invention, also meets the problem of taking-off and landing the craft at reasonable speeds because, when the wings are swept back, a substantial portion thereof is buried in the fuselage; whereas, when the wings are extended, a substantial increase in exposed wing area and an increase in the aspect ratio provides the craft with the necessary lift and efficiency needed for relatively low speed flight.

The delta wing, as developed in this application, offers the following advantages over the conventional swept-back wing supersonic aircraft:

(a) The delta wing, being designed so as to operate in subsonic airflow, will have lower drag characteristics and better control characteristics;

(b) Less horsepower would be required to drive the craft due to the reduced drag;

(c) Less structural weight, due to the deeper spar permitted by the thick airfoil section, presents greater strength and rigidity to be brought directly into the spar and requires less in the way of auxiliary strengthening members;

(d) An airfoil section of substantial thickness for high lift coefficient when the wings are extended;

(e) The deeper spar also provides more space for stowing the landing gear and also permits the gear to be located closer to the root of the wing as compared to a fixed delta wing, thereby saving weight;

(f) The wing, inasmuch as it always operates in subsonic airflow, would be less sensitive to manufacturing irregularities and productivity thereof would thereby be greatly simplified; and (g) A high aspect ratio for efficient subsonic flight landing and take-off and the pursuit of slower and more maneuverable targets.

It will be understood that this invention is susceptible to modifications in order to adapt it to different usages and conditions, and, accordingly, it is desired to comprehend such modifications within this invention as may fall within the scope of the appended claims.

I claim:

1. In an aircraft; a fuselage, primary wing portions projecting laterally from said fuselage, vertical pivot means joining the inner ends of the primary wing portions to the fuselage for movement of the primary wing portions in a horizontal plane between retracted and extended positions on the fuselage, power means in the fuselage connected with said primary wing portions for moving them between their extended and retracted positions, said fuselage having slots in the sides to receive portions of said primary wing portions as they are moved toward their retracted position, secondary wing portions, each of said secondary wing portions having a first pivot connection at one point to the fuselage and having a second pivot connection at a point spaced from said first point to a respective one of said primary wing portions, whereby each said secondary wing portion is arranged to rotate about said pivots and to move into the fuselage when the respective primary wing portion is extended and rotate about said pivots and to move out of the fuselage and form an extension at the root of the primary wing portion on the leading edge thereof when the primary wing portion is retracted.

2. In an aircraft; a fuselage, wings projecting laterally from said fuselage, vertical pivot means joining the inner ends of the wings to the fuselage for movement of the wings in a horizontal plane between retracted and extended positions on the fuselage, power means in the fuselage connected with the wings for moving them between their extended and retracted positions, said fuselage having slots in the sides to receive portions of said wings as they are moved toward their retracted position, said fuselage also having laterally extending stabilizer members at the rear forming contral surfaces in the same horizontal plane as said wings, and the trailing edges of said wings comprising vertically separable flap portions so as to embrace therebetween the leading edges of said lateral members when the wings are retracted thereby to form a single airfoil section from each wing and the adjacent lateral member.

3. In an aircraft; a fuselage, wings projecting laterally from said fuselage, vertical pivot means joining the inner ends of the wings to the fuselage for movement of the wings in a horizontal plane between retracted and extended positions on the fuselage, power means in the fuselage connected with the wings for moving them between their extended and retracted positions, said fuselage having slots in the sides to receive portions of said wings as they are moved toward their retracted position, said fuselage also having laterally extending stabilizer members at the rear forming control surfaces in the same horizontal plane as said wings, and the trailing edges of said wings comprising vertically separable flap portions so as to embrace therebetween the leading edges of said lateral members when the wings are retracted thereby to form a single airfoil section from each wing and the adjacent lateral member, said flap portions being adapted for pivoting movement in a vertical plane as a unit when the wings are extended for functioning as ailerons or landing flaps.

4. In an aircraft; a fuselage, wings projecting laterally from said fuselage, vertical pivot means joining the inner ends of the wings to the fuselage for movement of the wings in a horizontal plane between retracted and extended positions on the fuselage, power means in the fuselage connected with the wings for moving them between their extended and retracted positions, said fuselage having slots in the sides to receive portions of said wings as they are moved toward their retracted position, said wings having portions connected thereto that are disposed substantially completely within the fuselage and are thus in aerodynamically ineffective position when the wings are in extended position and which are disposed outside the fuselage in aerodynamically effective position when the wings are in retracted position, said portions comprising small airfoils attached to the wings and located on the leading sides thereof adjacent the fuselage end thereof and extending angularly from the wings so as to be at least partially buried in the fuselage when the wings are extended and to extend laterally from the fuselage when the wings are retracted, said fuselage being slotted for receiving said small airfoils.

5. In an aircraft; a fuselage, wings projecting laterally from the fuselage, spars in the wings extending lengthwise thereof, a first vertical pivot member in the fuselage for each wing, a link pivoted between each said pivot member and a point on the spar of the pertaining wing outwardly from the inner end of the said spar, a second vertical pivot member in the fuselage forwardly of said first vertical pivot member, second links pivoted between said second pivot member and the inner ends of said spars, said links supporting said wings for movement on the fuselage in a horizontal plane between retracted and extended positions, and power means for moving said links about said pivot members to move the wings in a horizontal plane between said extended and retracted positions while simultaneously causing a forward shift of the wings on the fuselage as the wings move toward their retracted position whereby the center of pressure of said wings remains in about the same transverse plane relative to the said fuselage.

6. An aircraft arrangement according to claim 5 wherein said first pivot members are spaced on opposite sides of the longitudinal axis of the fuselage and each wing is slotted on its trailing side to receive the pertaining first pivot member when the wings are retracted.

References Cited in the file of this patent

UNITED STATES PATENTS

| | | |
|---|---|---|
| 1,237,318 | Flink | Aug. 21, 1917 |
| 1,723,763 | Burnelli | Aug. 6, 1929 |
| 1,862,102 | Stout | Jan. 7, 1932 |
| 1,998,148 | Vieriu | Apr. 16, 1935 |
| 2,041,688 | Barnhart | May 26, 1936 |
| 2,074,897 | Everts | Mar. 23, 1937 |
| 2,410,239 | Roe | Oct. 29, 1946 |
| 2,434,341 | Anderson | Jan. 13, 1948 |
| 2,444,332 | Briggs et al. | June 29, 1948 |
| 2,509,238 | Martin | May 30, 1950 |
| 2,539,489 | Smith | Jan. 30, 1951 |
| 2,670,910 | Hill et al. | Mar. 2, 1954 |
| 2,683,574 | Peterson | July 13, 1954 |

FOREIGN PATENTS

| | | |
|---|---|---|
| 613,382 | Great Britain | Nov. 25, 1948 |
| 651,436 | Great Britain | Apr. 4, 1951 |
| 664,058 | Great Britain | Jan. 2, 1952 |
| 864,205 | France | Jan. 13, 1941 |
| 917,753 | France | Jan. 18, 1950 |